March 7, 1950
W. A. SHERBONDY
DISPENSING DEVICE FOR CALKING
MATERIAL AND THE LIKE
2,499,610
Filed May 24, 1947
2 Sheets-Sheet 1
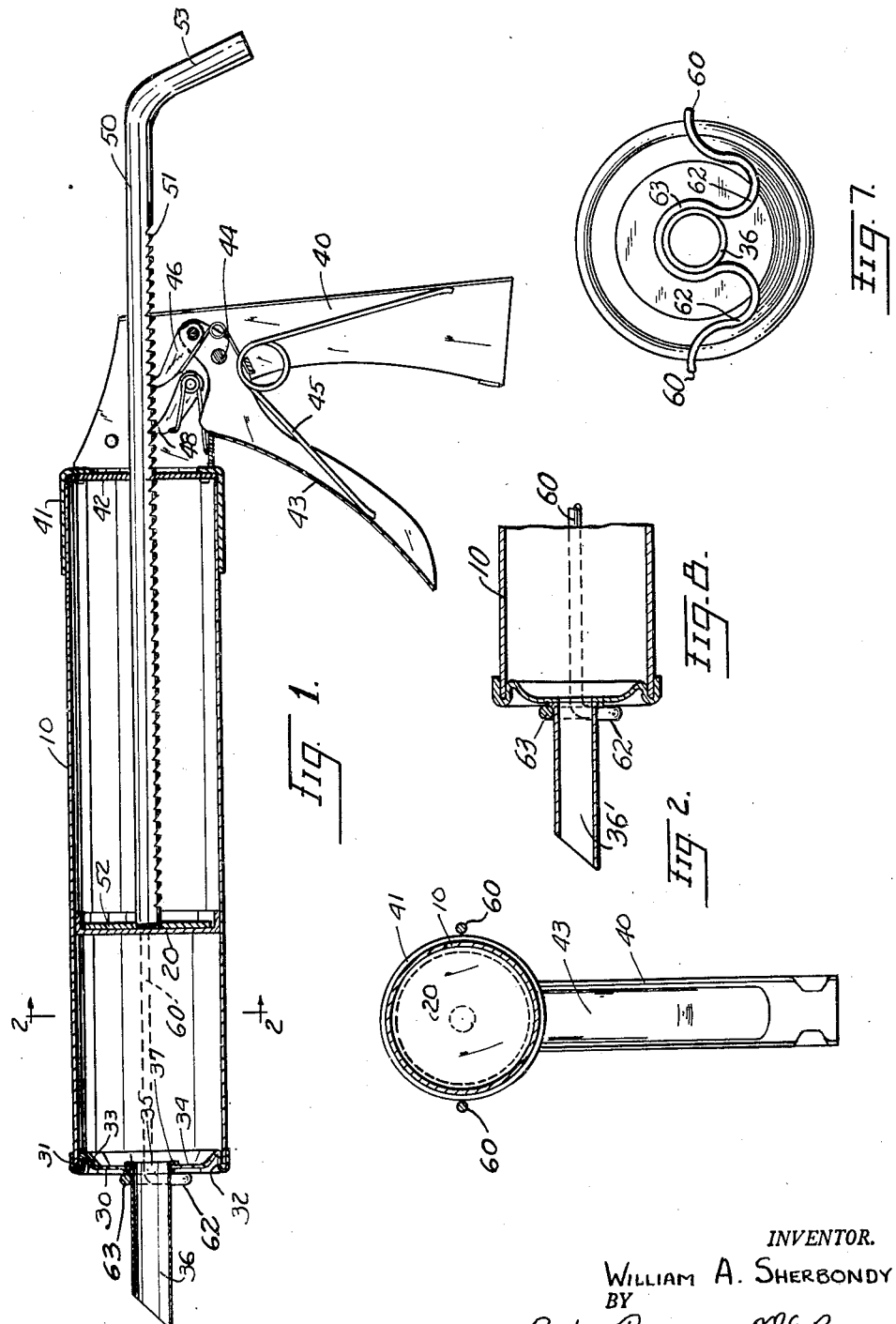
INVENTOR.
WILLIAM A. SHERBONDY
BY
Bates, Teare, & McBean
ATTORNEYS March 7, 1950  W. A. SHERBONDY  2,499,610
DISPENSING DEVICE FOR CALKING
MATERIAL AND THE LIKE
Filed May 24, 1947  2 Sheets-Sheet 2
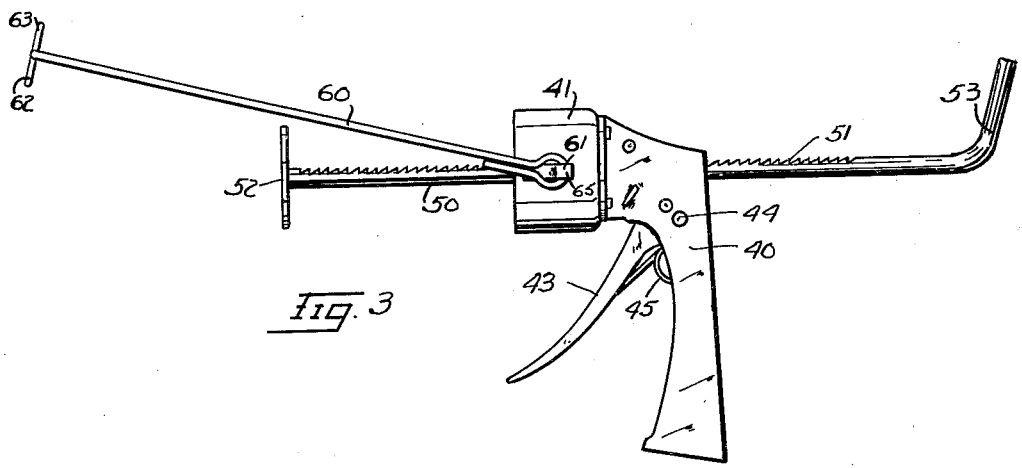
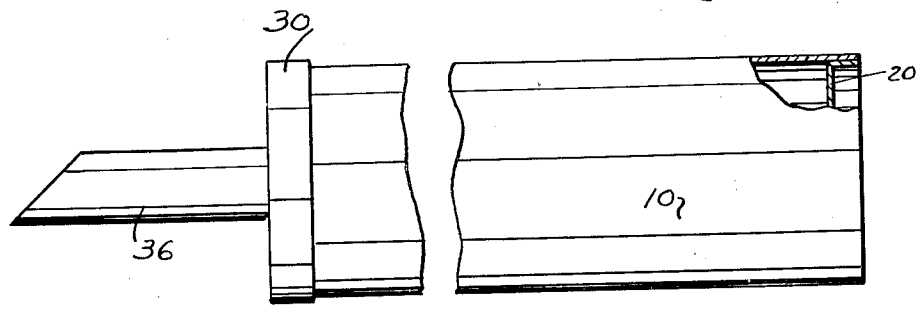
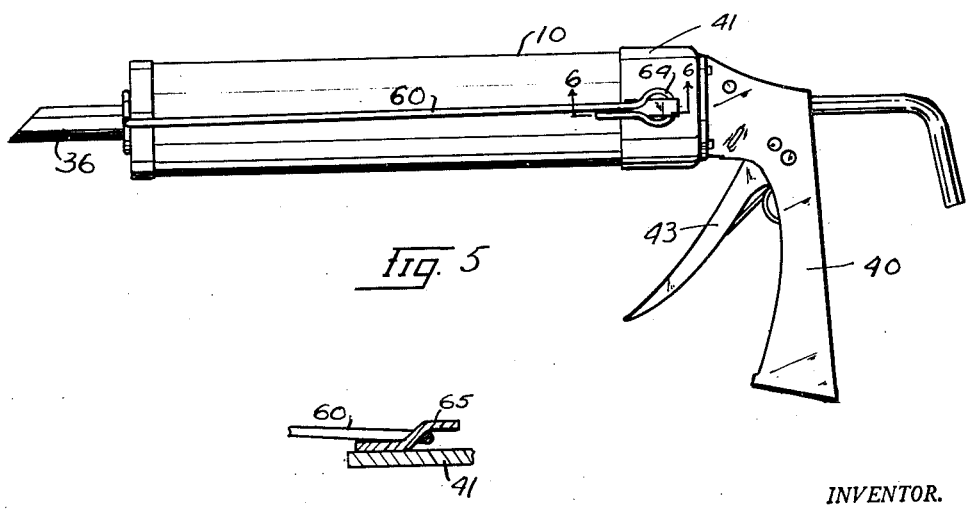
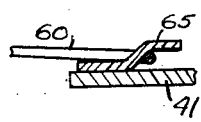
INVENTOR.
WILLIAM A. SHERBONDY
BY
Bates, Teare, & McBean
ATTORNEYS Patented Mar. 7, 1950

2,499,610

UNITED STATES PATENT OFFICE 2,499,610

DISPENSING DEVICE FOR CALKING MATERIAL AND THE LIKE

William A. Sherbondy, Shaker Heights, Ohio

Application May 24, 1947, Serial No. 750,187

5 Claims. (Cl. 222—326)

This invention relates to a dispensing device for calking material and the like, comprising a handle in which one end of a cartridge adapted to contain such material may be mounted, the handle carrying bail means to engage the far end of the cartridge and hold it in place and being equipped with manually operable feeding mechanism to expel the contents from the cartridge. The object of the invention is to provide an extremely simple device for securing the cartridge in place, enabling the expulsion of the contents as desired by manipulation of a suitable hand lever on the handle.

In its preferred form my invention employs a cartridge in the form of a paper tube having at one end an internal cap which may act as a plunger in extruding material, and at the other end a cap having a central opening through which the extrusion takes place. A spout, which may be carried either by the cartridge itself or by the dispensing apparatus, registers in use with the discharge opening. When the discharge opening, or spout if one is mounted on the cartridge, is closed by a suitable frangible strip or removable plug, the cartridge with its two caps forms a ready shipping container for the calking material.

When it is desired to use the cartridge, it is only necessary to mount it in the dispensing apparatus, which as previously stated, includes a loop or bail carried by the handle and adapted to overhang the front end of the cartridge to hold it in place. The discharge apparatus also comprises a pusher rod, means to advance the rod and means to retain the gain made. The pusher rod acts to advance the internal cap of the cartridge as a plunger to force out the seal and then discharge the contents of the cartridge through the spout.

A preferred form of the invention is illustrated in the drawings hereof and is hereinafter more fully described and the essential novel features are set out in the claims.

In the drawings, Fig. 1 is a longitudinal section of the complete dispensing device showing the cartridge mounted in position in the apparatus; Fig. 2 is a fragmentary section through the positioned cartridge looking toward the handle of the discharging apparatus; Fig. 3 is a side elevation of the dispensing apparatus showing the hand grip, pusher mechanism and bail before the cartridge is applied; Fig. 4 is a side elevation partly broken away of the cartridge; Fig. 5 is a side elevation of the complete dispensing device with the cartridge in place; Fig. 6 is a detail showing the anchorage of the bail, being a section indicated by the line 6—6 on Fig. 5; Fig. 7 is an end elevation of the device looking toward the discharge end; and Fig. 8 is a fragmentary section showing a modified construction.

As shown in the drawings, 10 indicates the body of the cartridge, which is a paper tube similar to a mailing tube preferably spirally wound. 20 indicates an internal cap at the head end of the cartridge, which is preferably a sheet metal member having an internal flange leading toward the head end of the tube and snugly engaging the wall thereof. 30 indicates a cap at the discharge end of the tube, which cap is provided with a central discharge opening 35. A discharge spout 36 is shown as mounted in the opening 35, though it may be carried by the dispensing apparatus. In either case, when in use, the spout registers with the discharge opening in the cartridge.

The cartridge with its tubular body and two caps and with the discharge opening closed (either by a suitable frangible strip across the opening or a removable plug in the spout, if the spout is mounted on the cartridge) constitutes the shipping container for the calking compound or other material.

I have shown the cap or closure 30 as comprising a disc-like member having an external flange 31 to engage the exterior of the tube and an internal annular portion 32 to engage the interior of the tube. From the inner edge of the annular portion 32 a conical portion 33 leads outwardly and acts to stiffen the construction in this region, and then from the outer edge of this conical portion there is a disc portion 34 having the round central opening 35. The two walls 31 and 32 flare from each other slightly so that the cap may be readily placed over the discharge end of the paper tube and being forced lengthwise of the tube will press the material of the tube between the external flange 31 and the internal wall 32.

The spout 36 may consist simply of a sheet metal member bent onto itself to produce a nearly complete tube having a flange 37 at the inner end. This tube may be shoved from the inner face of the cap outwardly until the flange 36 abuts the disc-like portion 34 of the cap or closure 30 and the resilience of the split tube tending to open it will hold it in place. When in place the longitudinal slot between the meeting edges of the sheet metal making the spout is substantially closed.

In shipping the container carrying the spout, I provide a plug of rubber or other suitable material "not shown" in the spout adjacent its discharge end. If the container is shipped without the spout the discharge opening is closed by a thin readily frangible strip of material secured to the inner face of the cap and extending across the opening. Alternatively the spout or discharge opening may be closed in any suitable manner.

When the cartridge is to be used it is placed in the dispensing apparatus about to be described, which includes a pushing rod or means adapted to push the internal cap or follower 20 into the tube, and thus extrude the material through the opening at the discharge end of the cartridge. The force of the advancing material forces out the plug in the spout or breaks the frangible seal on the cap, as the case may be.

The dispensing apparatus referred to comprises a body or handle 40 preferably made of sheet material doubled forwardly on itself and formed into a hand grip terminating above in a short cylindrical sleeve 41 adapted to embrace the head end of the tube or cartridge and form a seat therefor. Within the space between the two walls of the hand grip is a hand lever 43 pivoted at 44 and normally pressed forwardly by a spring 45. The hand lever carries a pawl 46 pressed upwardly by a spring so that it may engage the teeth 51 on a pusher rod 50 and thus feed the rod when the lever is drawn rearwardly. A detent pawl 48 pivoted to the handle in front of the pawl 46, and pressed upwardly by a spring retains the gain made by the feeding pawl 46.

It is convenient to form the sleeve 41 separate from the hand grip 40 and to secure the sleeve 41 to the hand grip 40 by forming the sleeve with an inturned end flange and seating within the sleeve a disc 42 riveted to outwardly turned portions of the hand grip 40.

The pusher rod 50 extends into the interior of the cylindrical cap 41 and at its forward end carries a disc 52 adapted to abut the internal cap 20 of the cartridge. Thus the plate or disk 52 and cap 20 make a piston adapted to be forced through the body of the cartridge to extrude the contents. The extreme outer end of the rod 50 is provided with a suitable handle as, for instance, a downturned portion 53. When this handle projects downwardly the teeth 51 are on the underside of the rod, and the rod is in position to be fed forwardly by the operation of the hand lever. To withdraw the rod after the material has been extruded it is only necessary to give it a half rotation so that the teeth 51 are cleared from the pawls 46, 48 and then the rod may be freely pulled outwardly by its handle 53.

To hold the cartridge in place against the handle assembly, I provide a bail 60 which is pivoted at 61 to the handle sleeve 41 and is adapted to extend at its farthest portion across the discharge end of the cartridge, and thus hold the cartridge in place with its other end in the handle sleeve. This bail is of wire formation and at the discharge end, as shown particularly in Fig. 7, each leg of the bail extends by bends first inwardly and downwardly and then by return bends 62 inwardly, upwardly and inwardly to form a cross section or yoke including a downwardly facing central loop 63 which is adapted to embrace the spout of the cartridge, indicated by broken lines in this figure.

In mounting the cartridge in the dispensing apparatus, the bail 60 is swung to idle position and the head end of the cartridge is shoved into the handle sleeve 41 and then the bail is sprung over the far end of the cartridge. The straight legs of the bail are of such length with reference to the cartridge that the looped transverse or cross portion of the bail engages snugly against the outer face of the end cap 30 of the cartridge and thus holds the cartridge effectively seated against the transverse end of the handle sleeve 41.

If the spout is carried by the cartridge the intermediate U-shaped loop 63 of the bail which has a restricted entrance is simply sprung across the spout in positioning the bail in working position. If desired, however, the spout may be carried by the bail itself being mounted in this U-shaped loop 63, as indicated at 36' in Fig. 8. When so mounted the dispensing apparatus is well adapted for operation with a cartridge having at the discharge end a central opening but no spout. Therefore in either case the bail in active position snugly embraces the spout and the spout registers with the discharge opening.

It will be seen that the resilience of the bail holds the cartridge effectively in position in the dispensing apparatus so that as the hand lever 43 is operated the disc 52 on the push rod 50 engaging the plunger or follower cap 20 within the cartridge forces the material in the cartridge lengthwise of the cartridge and extrudes the endmost portion through the discharge opening. At the beginning of the operation the pressure will break the seal or push out the rubber plug in the spout and thereafter the plastic material may be discharged or extruded, as desired.

While any suitable means may be employed to anchor the two ends of the bail to the handle, I prefer to secure to the opposite sides of the handle sleeve 41, preferably by welding, a pair of short clips 65 which bend outwardly and then extend parallel with the sleeve wall, as shown in Fig. 6. This makes a very convenient projecting hook across which the looped end 64 of the bail may be conveniently passed. The opening of this looped end is snug enough on the outward offset of the clip so that the bail will not inadvertently become detached from the handle when the cartridge is absent, but may be readily removed if desired.

The discharge apparatus shown is extremely simple and of relatively inexpensive construction. The cartridge whether equipped with a spout or otherwise may be readily mounted therein and when so mounted a complete calking gun is provided. The gun shown has readily operable manual mechanism for intermittently advancing the plunger or follower to extrude the material in the cartridge through the discharge spout and may be used in the usual manner of a conventional calking gun. The cartridge may remain in the apparatus as part of the complete gun until the material has been entirely used. Thereafter a mere manual pressure on the transverse or cross looped portion at the far end of the wire bail will free the used cartridge and enable the installation of a full one.

I claim:

1. In a dispensing apparatus for viscous material contained in a rigid tubular cartridge having a head end closed by a follower and a closed discharge end provided with a discharge opening, handle means provided with a seat portion for receiving the head end of a cartridge, a pusher movably supported by said handle means and adapted to engage the follower and advance it into the cartridge, manually operatable mechanism operatively interconnecting said handle means and said pusher and actuatable for advancing said pusher and holding it in each position to which it is advanced, and a bail pivotally connected to said handle means and extending forwardly thereof for releasably holding the said cartridge in engagement with the said seat portion, the said bail including parallel legs spaced apart a distance at least equal to the outside diameter of said cartridge and a cross portion interconnecting the said spaced legs and adapted in the operative position of said bail to extend across the discharge end of a cartridge positioned in the apparatus to hold the cartridge in place, the said cross portion including a substantially U-shaped portion having a width less than the diameter of said cartridge straddling the said discharge opening of the cartridge held in the apparatus and portions interconnecting said U-shaped portion and said legs.

2. In a dispensing apparatus for viscous material contained in a rigid tubular cartridge having a head end closed by a follower and a closed discharge end provided with a discharge opening, handle means provided with a seat portion for receiving the head end of a cartridge, a pusher movably supported by said handle means and adapted to engage the follower and advance it into the cartridge, cooperating means provided upon said pusher and handle means manually operatable for advancing said pusher and holding it in each position to which it is advanced, and a unitary wire bail pivotally connected to said handle means and extending forwardly thereof for releasably holding the said cartridge in engagement with the said seat portion, the said bail including parallel legs spaced apart a distance at least equal to the outside diameter of said cartridge and a cross portion interconnecting the said spaced legs, the distance from said cross portion of the bail to the said seat portion of the handle means being substantially equal to the length of said cartridge and the said cross portion including a substantially U-shaped portion the width of which is less than the diameter of a said cartridge, whereby the said cross portion of the bail in cartridge holding position extends across the discharge end of a cartridge positioned in the apparatus in resilient engagement with the cartridge and with the said U-shaped portion straddling the said discharge opening in the cartridge.

3. In a dispensing apparatus for viscous material contained in a rigid tubular cartridge having a head end closed by a follower and a closed discharge end provided with a discharge opening, handle means provided with a seat portion for receiving the head end of a cartridge, a pusher movably supported by said handle means and adapted to engage the follower and advance it into the cartridge, manually operatable mechanism operatively interconnecting said handle means and said pusher and actuatable for advancing said pusher and holding it in each position to which it is advanced, a bail pivotally connected to said handle means and extending forwardly thereof, the said bail including parallel legs spaced apart a distance at least equal to the outside diameter of said cartridge and a cross portion interconnecting the said spaced legs, the distance from said cross portion of the bail to the said seat portion of the handle means being approximately equal to the length of said cartridge with the said cross portion including a substantially U-shaped portion and portions extending transversely of said legs interconnecting said U-shaped portion and said legs, and a spout having a diameter less than that of said cartridge releasably engaged by the said U-shaped portion and held thereby in aligning engagement with the said discharge opening of the cartridge positioned in said apparatus when the said bail is in operative position, the said transverse portions then extending transversely of the said discharge end of the cartridge.

4. In a dispensing apparatus for viscous material contained in a rigid tubular cartridge having a head end closed by a follower and a discharge end provided with a discharge spout of less diameter than that of said cartridge, handle means provided with a sleeve-like seat portion for receiving the head end of a cartridge, a pusher adapted to engage the follower and advance it into the cartridge, an actuating rod movably supported by said handle means and connected with said pusher, cooperating means provided upon said rod and said handle means manually operatable for advancing said rod and pusher and holding them in each position to which they are advanced, and a unitary wire bail pivotally connected to said handle means and extending forwardly thereof for releasably holding the said cartridge in engagement with the said seat portion, the said bail including parallel legs spaced apart a distance at least equal to the outside diameter of said cartridge and a cross portion interconnecting the said spaced legs, the distance from said cross portion of the bail to the said seat portion of the handle means being approximately equal to the length of said cartridge and the said cross portion including a substantially U-shaped portion having a width such that the U-shaped portion resiliently embraces the said spout of a cartridge positioned in the apparatus when the said bail is in cartridge holding position, the said cross portion of the bail further including portions interconnecting said U-shaped portion and said legs with the last-mentioned portions extending transversely of the discharge end of a cartridge positioned in the apparatus.

5. In a dispensing apparatus for viscous material contained in a rigid tubular cartridge having a head end closed by a follower and a closed discharge end provided with a discharge opening, handle means provided with a sleeve-like seat portion for receiving the head end of a cartridge, a pusher adapted to engage the follower of the cartridge and advance it into the cartridge, an actuating rod movably supported by said handle means and connected with said pusher, cooperating means provided upon said rod and handle means manually operatable for advancing said rod and pusher and holding them in each position to which they are advanced, a unitary wire bail pivotally connected to said handle means and extending forwardly thereof, the said bail including parallel legs spaced apart a distance at least equal to the outside diameter of said cartridge and a cross portion interconnecting the said spaced legs, the distance from said cross portion of the bail to the said seat portion of the handle means being approximately equal to the length of said cartridge with the said cross portion including a substantially U-shaped portion the width of which is less than the diameter of said cartridge and portions extending transversely of said legs interconnecting the said U-shaped portion and said legs, and a spout resiliently engaged by the said U-shaped portion and held thereby in aligning engagement with the said discharge opening of the cartridge positioned in said apparatus when the said bail is in operative position, the said transverse portions then extending transversely of the said discharge end of the cartridge.

WILLIAM A. SHERBONDY.

REFERENCES CITED

The following references are of record in the file of this patent:

UNITED STATES PATENTS

| Number | Name | Date |
|---|---|---|
| 1,157,552 | Kispert | Oct. 19, 1915 |
| 1,279,069 | Yoshida | Sept. 17, 1918 |
| 1,737,857 | MacGregor | Dec. 3, 1929 |
| 2,115,591 | Sherbondy | Apr. 26, 1938 |
| 2,129,801 | Wallace | Sept. 13, 1938 |
| 2,367,347 | Good | Jan. 16, 1945 |